Aug. 18, 1925.                                          1,549,961
W. W. BUCKBEE
METHOD OF AND APPARATUS FOR VULCANIZING RUBBER TUBES
Filed Feb. 10, 1925
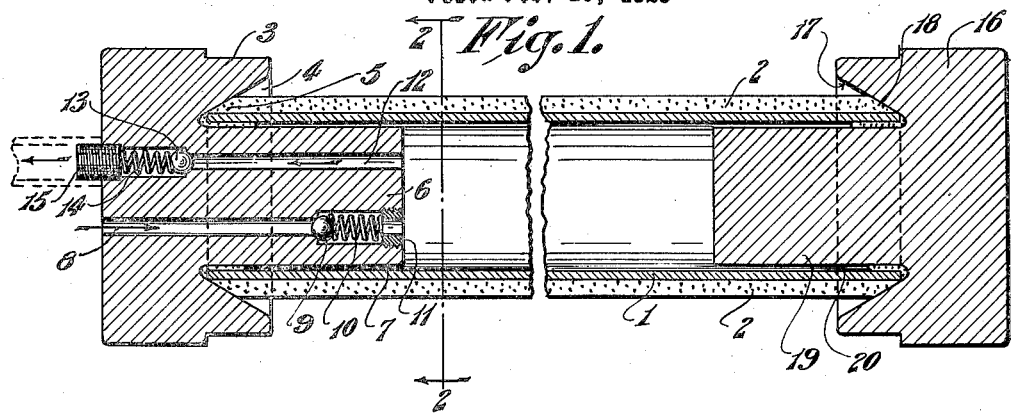
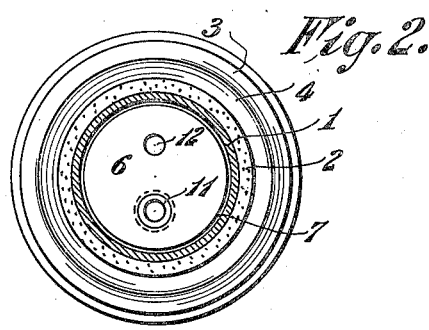
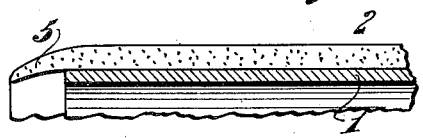
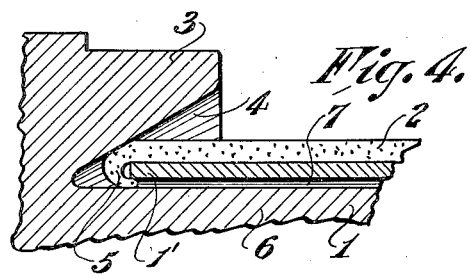
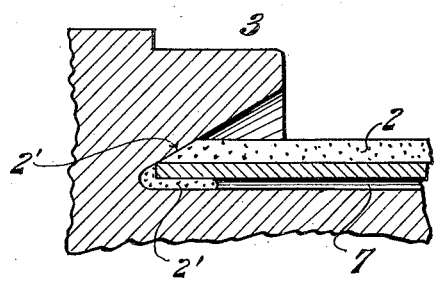
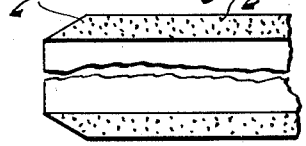
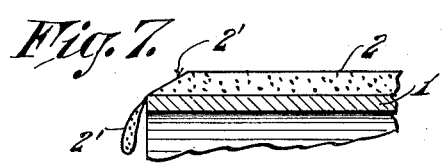
INVENTOR,
William W. Buckbee,
BY
Harry W. Bowen.
ATTORNEY.

Patented Aug. 18, 1925.

1,549,961

UNITED STATES PATENT OFFICE.

WILLIAM W. BUCKBEE, OF CHICOPEE FALLS, MASSACHUSETTS.

METHOD OF AND APPARATUS FOR VULCANIZING RUBBER TUBES.

Application filed February 10, 1925. Serial No. 8,156.

*To all whom it may concern:*

Be it known that I, WILLIAM W. BUCKBEE, a citizen of the United States, residing at Chicopee Falls, in the county of Hampden and State of Massachusetts, have invented new and useful Improvements in the Methods of and Apparatus for Vulcanizing Rubber Tubes, of which the following is a specification.

This invention relates to improvements in the method of and apparatus for vulcanizing rubber tubes and has special reference to the vulcanization of inner tubes for motor vehicle tires.

An object of the invention is to provide a device which will automatically seal the ends of the tube during the process of vulcanization.

A further object is to provide a device whereby the finished length of the tube may be accurately determined before its ends are united and without any substantial loss of material.

A further object is to provide a device for exhausting the air within a hollow mandrel, or tube, and for permitting live steam to enter the mandrel for supplying the correct temperature for vulcanizing the tube material.

Broadly considered the invention comprises a mandrel or tube member of metal of a definite length and around which a sheet of rubber compound is wrapped or placed either one or more layers as desired. Clamp pieces for sealing and closing the ends of the tube are provided. The clamp pieces are so constructed that they will automatically pinch the ends of the wrapped rubber stock against the ends of the tube and automatically seal the ends of the mandrel when the atmospheric pressure within the mandrel is reduced by any suitable air exhausting apparatus. A suitable valve is provided for permitting the air to be withdrawn from the tube and another valve for permitting live steam to enter the mandrel when it is placed in a vulcanizing oven or heater or enclosure into which live steam is admitted.

Heretofore, it has been a common practice to vulcanize such tubes longer than is required to complete the finished tubes with the result that the surplus material must be cut away or removed from its ends before the ends of the tube are closed and vulcanized together to form the finished article or inner tube. This operation results in waste of considerable tube material. By means of my improvement this loss of tube material is very largely prevented.

Referring to the drawings: Fig. 1 is a longitudinal sectional view on a plane passing through the axis of the mandrel and showing the complete apparatus with a layer of the rubber stock thereon and the two tube clamping pieces in position.

Fig. 2 is a transverse sectional view on the line 2—2 of Fig. 1 looking in the direction of the arrows.

Fig. 3 is a detail view showing the layer of rubber tube stock when wrapped or placed about the mandrel with its end extending beyond the end of the mandrel.

Fig. 4 is a view showing one end of the layer of rubber being bent around the end of the mandrel and partially into the space between the inner surface of the mandrel and the closure clamp.

Fig. 5 is a view showing the position of the rubber tube stock after the air in the mandrel has been nearly exhausted and illustrating the tapering feature of the end of the tube and pinching off or removing the surplus material and before the process of vulcanization is carried out.

Fig. 6 is a detail view of one end of the tube after vulcanization, and

Fig. 7 shows the surplus material which has been severed or removed from the end of the vulcanized tube.

Referring to the drawings in detail: 1 designates the metallic mandrel on which the rubber tube stock 2 is placed. 3 designates a clamp for closing one end of the mandrel and for engaging one of the ends of the tube stock. This clamp is formed with an inclined surface 4 which surface engages the end portion 5 of the tube material 2 as shown in Fig. 1.

It will be noticed that the diameter or entrance end of the hub portion 6 of the clamp 3 is slightly less than the internal diameter of the mandrel as indicated at 7. This clamp is formed with an opening 8 and near its inner end is placed a ball valve 9 which is normally held against its seat by the force of the expansion spring 10, the other end of the spring resting against the threaded ring 11. The clamp 3 is also formed with the opening 12 having near its outer end a ball valve 13, a spring 14, which normally retains the ball against its seat, and a threaded member 15 for attaching the hose thereto for making connection with a suitable air pump (not shown). The opposite end of the mandrel is also closed with a clamp member 16 which is similar to the clamp 3. This clamp is formed with an inclined or conical surface 17. The purpose of which is the same as that of the inclined surface 4 of the clamp 3, namely for pinching the end of the rubber tube stock and for sealing that end of the mandrel. The hub part 19 is also smaller in diameter than the internal diameter of the mandrel 1, as indicated at 20. The operation of these two inclined surfaces 4 and 17 operate to fold the projecting end part 5 (see Fig. 3) of the rubber tube stock 2 around the ends of the mandrel and into the spaces 7 and 20 when placed on the mandrel. Fig. 3 illustrates the rubber tube stock when first placed around the mandrel 1. Fig. 4 shows the end 5 of the rubber tube stock as partially folded around the end 1 of the mandrel and into the space 7. At this point in the operation of vulcanization the air pump which is attached at 15 is started causing the atmospheric pressure within the mandrel to be lowered. This operation has the effect of drawing the clamps 3 and 16 against the ends of the mandrel 1, bringing about the conditions shown in Fig. 5 where the end 5 of the rubber tube stock is pinched down into the inclined shape indicated at 2' (see Fig. 6), and, at the same time the surplus material 21 is drawn into the passageways 7 and 20. This surplus material being indicated at 21. The operation of the air pump and spring 14 causes the valve 13 to automatically close. After the air has been exhausted down to nearly a perfect vacuum the air pump is detached and the whole apparatus is then placed into a curing chamber or heater in the usual way into which chamber or heater live steam of suitable pressure is admitted. The steam from this heater passes through the opening 8 opening the valve 9, against the pressure of the spring 10 and entering the metallic mandrel 1. This live steam cures the rubber tube stock forming or vulcanizing a tube of the correct length. After the vulcanizing process has been carried on a suitable length of time, the device is removed from the curing heater and the clamping pieces 3 and 16 are removed. It being understood that the steam pressure within the mandrel 1 when in the heater is nearly equal to the pressure on the outside of the mandrel for the reason that the ball valve 13 will open when steam enters the mandrel by passing past the ball 9 since the spring 14 is a weak one. The spring 14 is of a strength only sufficient to move the valve 13 to its seat. If the pressure within the tube did not substantially equalize there would be danger of its collapsing when placed in the heater. The strength of the spring 10 must be greater than one atmosphere. It may be stated that when the pressure within the mandrel 1 nearly approaches that within the heater the valve 13 will be forced to its seat. The valve 13 will also be forced to its seat by the spring 14 and retained there until the pressure within heater or vulcanizer is reduced. The finished tube is now of the correct length and the surplus material 21 is readily detached or in other words, the ends of the tube are skived, as indicated at 2'. When the air is exhausted from the mandrel the external atmospheric pressure operates to maintain the two clamping members in place on the ends of the mandrel, and, at the same time the ends of the mandrel are sealed as already described.

It is to be understood that in the carrying out of my invention I do not intend to limit myself to the sole idea of wrapping a sheet or strip of rubber tube material about the mandrel 1 as I may, if found desirable draw a cylindrical piece of rubber over the tubular mandrel. The same operations would then be carried out in curing the tube.

The term "wrapped" is understood to include the idea of placing or pulling over the sheet of rubber tube stock about the mandrel.

The ends of the mandrel 1 may be effectually sealed by simply forcing the clamping members 3 and 16 firmly against the ends of the mandrel since these members are formed with inclined surfaces 4 and 17 which would operate and pinch or wedge onto the mandrel similar to the action of a clothes pin.

The spring 10 is made to operate at any desired steam pressures, as 50, 100 or 150 lbs. per square inch. The spring 14 merely holds the ball 13 to its seat.

It will be seen that I have provided a very efficient method of an apparatus for vulcanizing and forming the inner tubes for motor vehicle tires, one that is of the correct length when it is completed and results in the saving of material.

What I claim is:

1. A method of vulcanizing rubber tube stock material which consists in placing the material about a hollow mandrel, next placing clamping members on the ends of the mandrel and around the ends of the material, said clamping members being formed with conical shaped surfaces for pinching the ends of the rubber stock material, then exhausting the air from the interior of the mandrel for causing the clamps to pinch and close the ends of the mandrel.

2. A method of vulcanizing rubber tube stock material which consists in placing the material about a hollow mandrel, next placing material clamping members on the ends of the mandrel, each of said clamping members being formed with conical shaped surfaces for pinching the ends of the rubber stock material against the mandrel, then exhausting the air from the interior of the mandrel for causing the clamps to pinch and seal the ends of the mandrel, then introducing a heating medium into the mandrel for effecting the curing of the rubber stock mandrel.

3. A device for the purpose described comprising a tubular mandrel member about which the rubber stock material is to be placed clamping members for closing the ends of the mandrel, said members each having a conical shaped surface that engages the ends of the rubber stock material and which operates to form an air tight joint between the ends of the mandrel and the material, means for exhausting the air from the mandrel and means for introducing a heating medium for curing the rubber stock material.

4. A device for the purpose described comprising a tubular mandrel member about which rubber stock material is to be placed clamping members for closing the ends of the mandrel, said clamping members each having a conical shaped surface that engages the ends of the rubber stock material, and forms an air tight joint or seal between the ends of the mandrel and said material, means for exhausting the air and for introducing a heating medium for curing the rubber stock material, said clamps each having a part of less diameter than the interior diameter of the tubular mandrel, whereby when the atmospheric pressure is reduced within the mandrel, the ends of the rubber stock material will be drawn into space between the inner surfaces of the mandrel and the reduced parts of the clamps.

5. A device for curing inner tubes which comprises a tubular mandrel around which the material to be cured is placed, clamps for engaging the ends of the material, a part on the clamp which extends into the mandrel being of less diameter than the interior diameter of the mandrel, each clamp having conical shaped inside surface for engaging the end of the material and for partially forcing the ends of the material into the spaces between said parts of the clamp and the interior of the mandrel, whereby when the atmospheric pressure in the mandrel is reduced the surplus stock of the material will be drawn into said spaces and the length of the tube is determined.

6. A device for the purpose described comprising an open ended tubular member, to receive rubber stock material for curing the same, means for closing the ends of the said member and for pinching off any surplus material at ends of the said member to determine the length of the finished tube, said means being so constructed as to operate to seal or close the ends of said member when the air is exhausted, and means for exhausting the air from the interior of said member.

7. A device for the purpose described comprising an open ended tubular member, to receive rubber stock material for curing the same, means for closing the ends of the said member and for pinching off any surplus material at ends of the said member to determine the length of the finished tube, said means being so constructed as to operate to seal or close the ends of said member when the air is exhausted, and means for exhausting the air from the interior of said member, and means for equalizing the pressure both within and without the tubular member when said member is placed within a heating enclosure containing a heating medium under pressure.

WILLIAM W. BUCKBEE.